Nov. 25, 1947.                    J. G. HAYES                    2,431,325
    METHOD OF ELECTRICALLY WELDING METAL KEYS TO METAL CAN
        ENDS HAVING PROTECTIVE COATINGS OF LIMITED EXTENT
                        Filed Feb. 21, 1945
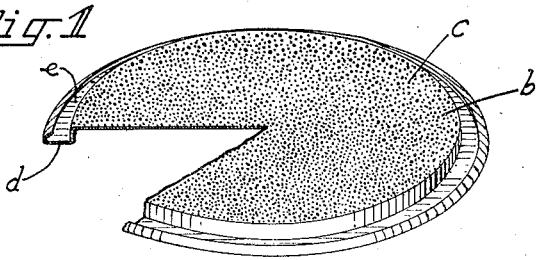
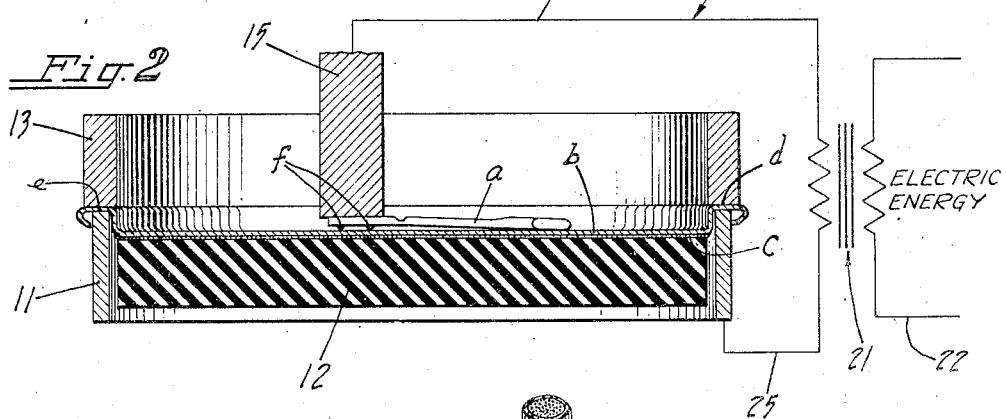
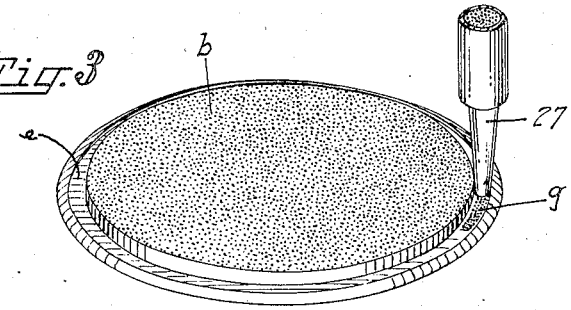
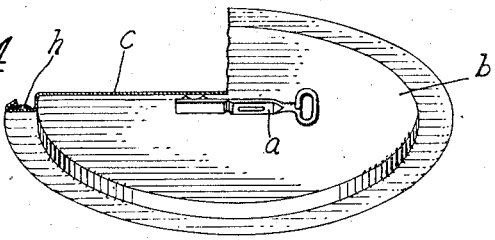
INVENTOR.
John G. Hayes
BY Ivan D. Thornburgh
Charles H. Erne
ATTORNEYS Patented Nov. 25, 1947

2,431,325

UNITED STATES PATENT OFFICE 2,431,325

METHOD OF ELECTRICALLY WELDING METAL KEYS TO METAL CAN ENDS HAVING PROTECTIVE COATINGS OF LIMITED EXTENT

John G. Hayes, San Mateo, Calif., assignor to American Can Company, New York, N. Y., a corporation of New Jersey Application February 21, 1945, Serial No. 579,020

4 Claims. (Cl. 219—10)

1

This invention relates to a method of electrically welding opening keys on can ends and has particular reference to the steps of welding the key on the exterior surface of a can end which carries a protective coating on the inner surface of the can end by utilizing the uncoated lining groove of the end for engagement with an electrode.

In the can making art it is often desirable to have a protective coating on the inner surface of the can and it has been found that the most effective coating requires a high baking temperature. This has caused the can manufacturer ordinarily to apply the required coating on the flat sheet or blank of metal stock prior to the can body or the can end being formed from such sheet or blank. Since a gasket material is required in the end joints between the can end and the can body, a liquid compound lining material has been found to be most desirable in the ordinary manufacture of the cans. In coating the surface of a sheet or blank which will later become the inside of a can end, the outer flange portion of the end area is left uncoated since this is the part that will subsequently be in contact with the gasket lining material.

The present invention contemplates utilizing this feature of having coated and uncoated portions of the inner surface of the can end by providing for engagement between one of the electrodes and the uncoated flange portion of the can end within the lining groove. In such a method the usual lining of the lining groove takes place after the welding of the key to the can end. The result of this procedure is that the coated portion of the interior of the can end is not disturbed during the welding operation as would occur if one electrode engaged the inner surface of the end opposite to the electrode which engages the key.

An object of the invention is the provision of a method of electrically welding opening keys to can ends having a portion of the inner surface of the end coated and having the lining groove of the flange of a can end uncoated, one electrode engaging this uncoated surface.

A further object of the invention is the provision of a welding method for providing can ends, having a portion of one surface coated, with an opening key welded to the opposite surface and with the uncoated surrounding inner surface of the end subsequently provided with a sealing gasket.

Numerous other objects and advantages of the invention will be apparent as it is better understood from the following description, which, taken in connection with the accompanying drawings, discloses a preferred embodiment thereof.

Referring to the drawings:

2

Figure 1 is a perspective view broken away of a partially coated can end illustrating a coated portion surrounded by an uncoated lining groove, such an end being provided with a welded opening key (not shown) according to the instant method steps;

Fig. 2 is an enlarged diagrammatic sectional view of the principal parts of a welding apparatus which illustrates the welding of a can opening key on the exterior surface of a can end showing the electrodes in operative position, an exemplary wiring diagram also being included;

Fig. 3 illustrates in perspective a partially coated can end having a key (not shown) welded to its exterior surface and illustrating the step of subsequently applying compound lining material to the uncoated lining groove of the end; and Fig. 4 is a perspective view partially broken away of the completely lined can end with its opening key shown welded in position on the exterior surface of the end.

In the present invention steps are provided in a method of welding metal opening keys $a$ to metal can ends $b$ in which the interior surface of the can end is centrally coated with a protective coating $c$, this coating extending over the entire surface which will be exposed on the interior of the can after the end has been double seamed to the can body in the usual manner. Surrounding this coated area the can end is uncoated, the uncoated part being confined to a flange portion $d$ of the end which embodies a usual gasket lining groove $e$.

In carrying out these steps a welding apparatus is employed in which an annular electrode 11 (Fig. 2) is used. This electrode is shaped to correspond with the contour of the lining groove $e$ of the can end $b$ and ordinarily constitutes an inner or lower electrode as shown. Since the gasket material for the can end has not yet been applied the welding face of the annular electrode engages directly against the metal stock of the end.

A support plate 12 is preferably used and is located inside of the welding electrode 11. This support plate is made of insulating material and the can end $b$ when placed in position for welding rests with its coated portion $c$ of the interior surface resting against the insulating support 12.

A hold-down ring 13 is preferably utilized in the welding apparatus and this ring is of a shape to substantially conform or correspond to the flange $d$ configuration of the can end $b$. The hold-down ring is positioned above the lower electrode 11 so that when the electrode is brought into engagement with the can end for welding, the hold-down plate 13 engages the exterior surface of the flange $d$ of the can end.

The opening key $a$ is preferably positioned within the usual countersunk exterior surface of the can end. This opening key is provided with one or more welding projections $f$ and these are brought into engagement against the exterior surface of the can end. The welding projections are preferably sharpened and in some cases where there is also a protective coating on the exterior of the can end this coating is penetrated by the welding projections during the welding operation. In any event, whether the can end is formed with an exterior coating or is left plain and uncoated, the opening key $a$ when in welding position rests with its welding projections $f$ engaging against the can end surface opposite to the insulating support member 12 of the welding apparatus.

An upper electrode 15 is so positioned as to engage against the end surface of the key $a$ opposite to the welding projections $f$. During the welding operation the required pressure for welding is obtained by a squeezing action between the upper electrode 15 and the supporting member 12 and between the hold-down plate 13 and the lower electrode 11.

Figure 2 illustrates in a wiring diagram a source of electric energy for the welding operation. This may take the form of a welding transformer 21 having a primary circuit 22 and a secondary circuit 23. Any suitable source of energy may be brought in through the primary circuit. The secondary circuit includes a wire 24 leading from the transformer 21 to the upper electrode 15 and a wire 25 leading from the transformer 21 to the lower electrode 11.

After the key $a$ has been welded to the end $b$ the lining groove $e$ of the end is supplied with a proper gasket material in the usual way. Fig. 3 illustrates such an end at a compound lining station. A suitable discharge nozzle 27 may be used to discharge a liquid compound lining material $g$ into the groove $e$ of the can end which may be rotated in the conventional manner. After applying the lining material to the entire groove of the can end, the same may be dried as usual to produce a lining gasket $h$, shown in Fig. 4.

By utilizing the steps of the present invention it is not necessary to make any change in the can end $b$ or in the opening key $a$. The same type of key may be used as is at present used in great numbers for opening containers. The securing of the can ends to the can body by double seaming may be carried out in the regular way and the resulting interiorly coated can thus is produced without damage to the coating of the end where the coating is disposed opposite the weld spots securing the key to the end.

It is thought that the invention and many of its attendant advantages, will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of electrically welding metal opening keys to metal can ends having a protective coating on a portion of one surface only thereof, which consists in bringing the uncoated portion of the coated suface of the can end into engagement with an electrode, arranging an opening key having a welding projection on the opposite uncoated surface of the can end, pressing a second electrode against said key to force said projection into close engagement with the metal end, and then welding the key to the can end while so pressed by passing an electric current between said electrodes and through the engaged metal parts of the key and the can end.

2. The method of electrically welding metal opening keys to metal can ends having a protective coating on a portion of one surface only thereof and having an uncoated flanged edge adjacent thereto, which consists in bringing the said flanged edge into engagement with an electrode, arranging an opening key having a welding projection on the opposite uncoated surface of the can end, holding the can end against said electrode, pressing a second electrode against said key while it is so held to force said projection into close engagement with the metal end, and then welding the key to the can end while so held by passing an electric current between said electrodes and through the engaged metal parts of the key and the can end.

3. The method of electrically welding metal opening keys to sheet metal can ends having a coated portion and an uncoated portion on one surface only thereof prior to applying a lining material to said uncoated surface portion of the can end, which consists in bringing said uncoated portion of the end into engagement with an electrode, arranging an opening key having a welding projection thereon on the opposiite uncoated surface of the can end, pressing a second electrode against said key to force said projection into engagement with the metal end, and then welding the key to the can end by passing an electric current between said electrodes and through the engaged metal parts of the key and the can end.

4. A method of electrically welding metal keys to sheet metal can ends having a centrally coated portion and a surrounding uncoated flange setting off a lining groove on an inner surface only thereof prior to applying a gasket lining material to said lining groove of the can end, which consists in bringing said uncoated flange into engagement with an electrode so that the electrode is disposed inside of said lining groove, positioning an opening key having a welding projection on the exterior uncoated opposite surface of the can end with the projection disposed opposite the centrally coated portion of the inner surface of the end, pressing a second electrode against said key to force said projection into engagement with the metal end, and then welding the key to the can end by passing an electric current between said electrode through the engaged metal parts of the key and the engaged and intervening parts of the can end.

JOHN G. HAYES.

REFERENCES CITED

The following references are of record in the file of this patent:

UNITED STATES PATENTS

| Number | Name | Date |
| --- | --- | --- |
| 1,861,970 | Meadowcroft | June 7, 1932 |
| 2,087,530 | Potchen | July 21, 1937 |
| 2,096,495 | Hogg | Oct. 19, 1937 |
| 2,326,806 | Shmurak | Aug. 17, 1943 |